United States Patent
Braghin et al.

(10) Patent No.: US 11,222,177 B2
(45) Date of Patent: Jan. 11, 2022

(54) INTELLIGENT AUGMENTATION OF WORD REPRESENTATION VIA CHARACTER SHAPE EMBEDDINGS IN A NEURAL NETWORK

(71) Applicant: INTERNATIONAL BUSINESS MACHINES CORPORATION, Armonk, NY (US)

(72) Inventors: Stefano Braghin, Dublin (IE); Cennet Oguz, Stuttgart (DE); Killian Levacher, Dundrum (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 16/839,950

(22) Filed: Apr. 3, 2020

(65) Prior Publication Data
US 2021/0312127 A1 Oct. 7, 2021

(51) Int. Cl.
*G06F 40/284* (2020.01)
*G06F 40/40* (2020.01)
*G06N 3/08* (2006.01)
*G06N 3/04* (2006.01)

(52) U.S. Cl.
CPC ........... *G06F 40/284* (2020.01); *G06F 40/40* (2020.01); *G06N 3/04* (2013.01); *G06N 3/08* (2013.01)

(58) Field of Classification Search
CPC ......... G06F 40/284; G06F 40/40; G06N 3/08; G06N 3/04

USPC .......................................................... 704/9
See application file for complete search history.

(56) References Cited

U.S. PATENT DOCUMENTS

| 10,062,039 | B1 | 8/2018 | Lockett |
| 10,108,902 | B1 | 10/2018 | Lockett |
| 10,346,737 | B1 | 7/2019 | Benitez et al. |
| 2017/0132510 | A1 | 5/2017 | Paluri et al. |

OTHER PUBLICATIONS

IPCOM000251990D; "Recognizing Semantic Formatting Information in a Document"; IPCOM Publication Date Dec. 13, 2017; (35 Pages).
IPCOM000252365D; "Retrospective User Input Inference and Correction"; IPCOM Publication Date Jan. 5, 2018; (38 Pages).
IPCOM000257007D; Lee et al.; "Method and System for Joint Embedding of Query and Ad By Leveraging Implicit Feedback"; IPCOM Publication Date Jan. 10, 2019; (4 Pages).
Luong, M-T. et al.; "Better Word Representations With Recursive Neural Networks for Morphology"; (10 Pages).
Pinter, Y. et al.; "Mimicking Word Embeddings Using Subword RNNS"; (11 Pages).

(Continued)

*Primary Examiner* — Thierry L Pham
(74) *Attorney, Agent, or Firm* — Griffiths & Seaton PLLC (57) ABSTRACT

Embodiments are provided for intelligent augmentation of word representations in a computing system by a processor. One or more character shape embeddings may be created in an artificial neural network (ANN) by augmenting one or more word representations based on a set of natural language processing (NLP) data, a set of word embedding vectors, and one or more clustering operations. A shape, a category, and a contextual identify of the one or more word representations may be analyzed used in creating the one or more character shape embeddings.

20 Claims, 8 Drawing Sheets

(56) References Cited

OTHER PUBLICATIONS

Kim, Y. et al.; "Character-Aware Neural Language Models"; Proceedings of the Thirtieth AAAI Conference on Artificial Intelligence (AAAI-16); (9 Pages).

Zadronzy, B. et al.; "Learning Character-Level Representation for Part-Of-Speech Tagging"; IBM Research—Brazil, Av. Pasteur, 138/146—Rio de Janeiro, 22296-903, Brazil; (9 Pages).

Word2Vec: Mikolov, T., Chen, K., Corrado, G., & Dean, J. (2013). Distributed Representations of Words and Phrases and their Compositionality. Nips, 1-9.

GloVe: Pennington, J., Socher, R., & Manning, C. D. (2014). GloVe: Global Vectors for Word Representation. Proceedings of the 2014 Conference on Empirical Methods in Natural Language Processing, 1532-1543.

Chen, X., Xu, L., Liu, Z., Sun, M., & Luan, H. (2015). Joint learning of character and word embeddings. IJCAI International Joint Conference on Artificial Intelligence, 2015-January(Ijcai), 1236-1242.

Santos, C. N. dos, & Gatti, M. (2014). Deep Convolutional Neural Networks for Sentiment Analysis of Short Texts. Coling-2014, 69-78.

INTELLIGENT AUGMENTATION OF WORD REPRESENTATION VIA CHARACTER SHAPE EMBEDDINGS IN A NEURAL NETWORK

BACKGROUND OF THE INVENTION

Field of the Invention

The present invention relates in general to computing systems, and more particularly, to various embodiments for intelligent augmentation of word representations in an neural network by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a form of artificial intelligence ("AI") that is employed to allow computers to evolve behaviors based on empirical data.

SUMMARY OF THE INVENTION

Various embodiments of intelligent augmentation of word representations in a computing system by a processor are provided. In one embodiment, by way of example only, a method for providing intelligent augmentation of word representations in an artificial neural network in a computing system, again by a processor, is provided. One or more character shape embeddings may be created in an artificial neural network (ANN) by augmenting one or more word representations based on a set of natural language processing (NLP) data, a set of word embedding vectors, and one or more clustering operations. A shape, a category, and a contextual identify of the one or more word representations may be analyzed used in creating the one or more character shape embeddings.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include Artificial neural networks ("ANNs") to perform computational tasks in a manner inspired by biological architectures of the nervous system. These networks are based on a principle of biological systems whereby neurons are interconnected via synapses which relay signals between the neurons. A biological neuron processes its input signals and generates output signals which are transmitted to other neurons via respective synapses. Artificial neural networks are based on a logical construction in which a succession of layers of neurons are interposed with layers of synapses, with each synapse interconnecting a respective pair of neurons in successive neuron layers. Signals relayed via synapses are weighted according to respective synaptic weights stored for the synapses. Weighted signals can thus be propagated over successive layers of the network from an input to an output neuron layer.

Additionally, natural language processing (NLP) is a field of computer science, artificial intelligence, and linguistics concerned with the interactions between computers and human (natural) languages. As such, NLP is related to the area of human-computer interaction, and especially with regard to natural language understanding that enables computers to derive meaning from human or natural language input. NLP systems may perform many different tasks, including, but not limited to, determining the similarity between certain words and/or phrases. One known way to determine the similarity between words and/or phrases is to compare their respective word embeddings.

A word embedding is a mapping of natural language text to a vector of real numbers in a continuous space (and is also sometimes referred to as a "vector representation"). That is, word embedding is the collective name for a set of feature representations in natural language processing where words or phrases from the vocabulary are mapped to vectors of real numbers in a low-dimensional space relative to the vocabulary size. Generally speaking, the word embeddings of similar words are located close to each other in the continuous space.

However, word embedding experience various limitations. For example, word embedding, character-based embeddings, as well as deep contextualized word representations captured via models may be used to produce dense vector representations of individual tokens. While these operations have been successful in capturing the contextual and semantic usage of individual tokens, these techniques currently disregard an important characteristic of tokens, namely their internal stylistic features. Word embedding models (such as Word2Vecm, GloVe etc., convert individual tokens into digits and subsequently focus on identifying their sequential co-occurrence in order to produce their respective vector representations. That is, word embedding vector is a vector of a token that is determined by an embedding technique, such as "word2vec".). A token may represent a word, phrase, abbreviation or other combination of alphanumeric natural language inputs. Each token may be transferred into feature vector (i.e., an array of numbers) where each field of the array (particular dimension of the vector) represents a different property of the token. However, by converting these tokens into digits, any internal character style similarities between tokens is lost. Consider the following two examples with word embedding operations (e.g., token2digit conversion operation performed: Example 1: "She asked Mary to sing a song (–token2ditget conversion-)=1, 2, 3, 4, 5, 6, 7 Example 2: "She asked John to sing a song (–token2ditget conversion-)=1, 2, 8, 4, 5, 6, 7

In Example 1 and 2, for instance, while the tokens and are different, their internal composition with respect to their character shape (e.g., a capital letter followed by lower case letters) is currently ignored due to the initial conversion of tokens into individual digits. While, the subsequent word embedding model used to encode these tokens will produce similar vectors due to their similar usage within the context of sentences, character shaped characteristics could clearly further assist NLP tasks, such as NER for instance.

Additionally, character-based embedding models may be used to address this issue by converting each character into digits and subsequently producing vector representations based on the usage of each character within the context of each other. However, while such character-based embedding models encode the contextual usage of characters (as depicted in character embeddings block 480 of FIG. 4), they produce vectorized representations of characters, again, which fails to capture their shape similarities. For example, due to a similar contextual usage of each character, pairs such as ("A", "a") and ("B", "b"), will tend to be possess similar vector representations. A character embedding model, which would capture the shape of each character in contrast, would tend to assign similar vectors instead to pairs ("A", "B") and ("a", "b"). To address this, each character may be assigned a common digit based on its shape such as, for example "a,b,c=1" and "A,B,C=2". However such an approach would then fail to capture the contextual usage of each individual character currently captured by existing character embeddings.

Accordingly, the present invention provides for character embeddings which can both capture the contextual usage of each character within a given language and at the same time capture the shape properties of these characters. A vector based character representation capturing both characteristics would depict a vector space such as, for example, the character shape embeddings 450 of FIG. 4. In contrast, using the previous example, pairs such as ("A", "B") and ("a", "b") possess closer vector representations compared to ("A", "a") and ("B", "b"). Additionally the contextual usage of each character is also preserved as characters "a" and "b," for example, do not possess the same vector representation.

In an additional aspect, the present invention provides for intelligent augmentation of word representations in a computing system by a processor are provided. In one embodiment, by way of example only, one or more character shape embeddings may be created in an artificial neural network (ANN) by augmenting one or more word representations based on a set of natural language processing (NLP) data, a set of word embedding vectors, and one or more clustering operations. A shape, a category, and a contextual identify of the one or more word representations may be analyzed used in creating the one or more character shape embeddings.

That is, the present invention uses existing word embeddings, clustering operations, and neural network computation in order to produce a new form of character vector embeddings which captures both a) per-character contextual usage, and b) character shape identity. In one aspect, the intelligent augmentation of word representations in a computing system may include performing an AI operation such as, for example, a natural language processing ("NLP") operation.

In an additional embodiment, a set of text based documents (e.g., a corpus of text data (e.g., text documents) and a set of word embedding vectors may be received as input. The set of text based documents and set of word embedding vectors may be ingested and transformed (via one or more clustering operations and ANN computing operations) into character-shape embedding vectors, a new word, and a character-shape embedding ANN layer, which can be incorporated to an existing arbitrary ANN.

It should be noted as described herein, the term "intelligent" (or "cognitive/cognition") may be relating to, being, or involving conscious intellectual activity such as, for example, thinking, reasoning, or remembering, that may be performed using a machine learning. In an additional aspect, cognitive or "intelligent may be the mental process of knowing, including aspects such as awareness, perception, reasoning and judgment. A machine learning system may use artificial reasoning to interpret data from one or more data sources and learn topics, concepts, and/or processes that may be determined and/or derived by machine learning.

In an additional aspect, cognitive or "intelligent" may refer to a mental action or process of acquiring knowledge and understanding through thought, experience, and one or more senses using machine learning (which may include using sensor based devices or other computing systems that include audio or video devices). Cognitive/intelligent may also refer to identifying patterns of behavior, leading to a "learning" of one or more events, operations, or processes. Thus, the intelligent model may, over time, develop semantic labels to apply to observed behavior and use a knowledge domain or ontology to store the learned observed behavior. In one embodiment, the system provides for progressive levels of complexity in what may be learned for operations or processes for intelligent augmentation of word representations.

In an additional aspect, the term intelligent may refer to an intelligent system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented intelligent operations that approximate a human thought process while enabling a user or a computing system to interact in a more natural manner. An intelligent system may use AI logic, such as NLP based logic, for example, and machine learning logic, which may be provided as specialized hardware, software executed on hardware, or any combination of specialized hardware and software executed on hardware. The logic of the intelligent system may implement the intelligent operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and intelligent; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human intelligent based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
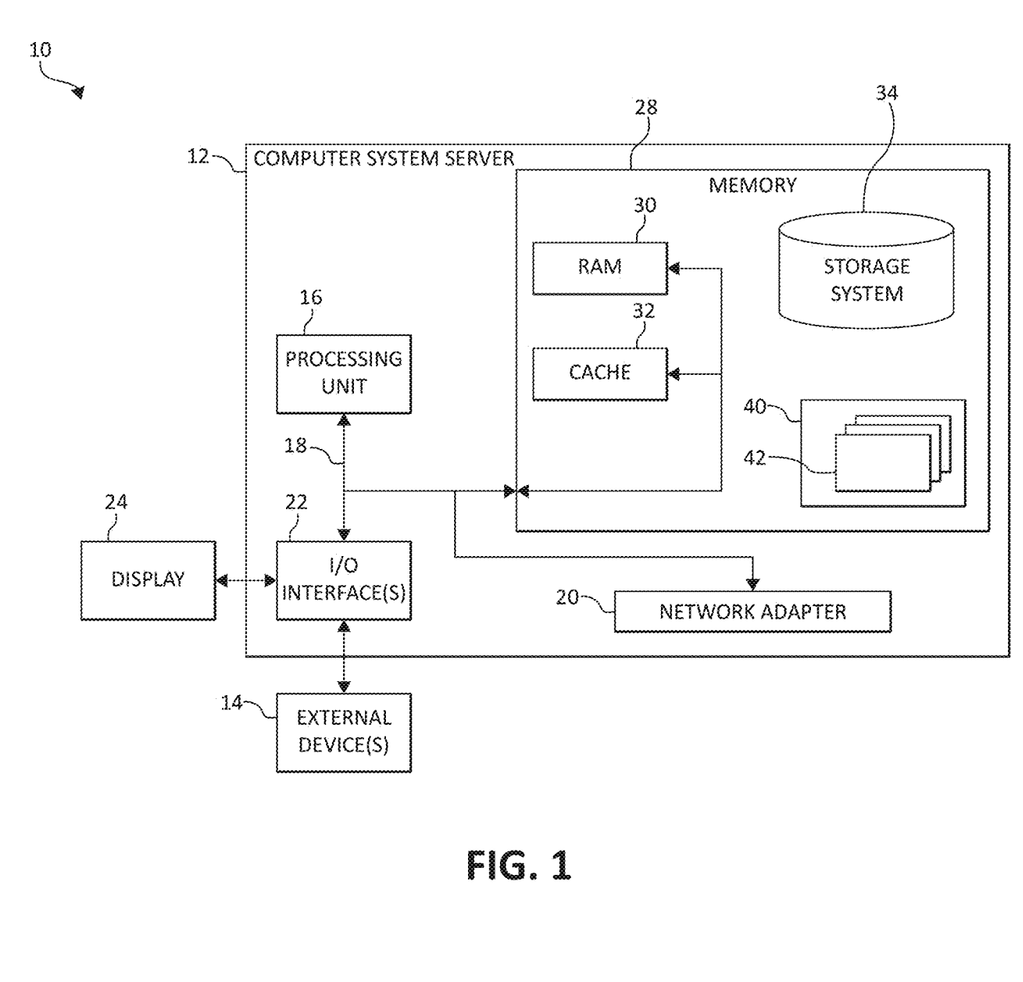
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
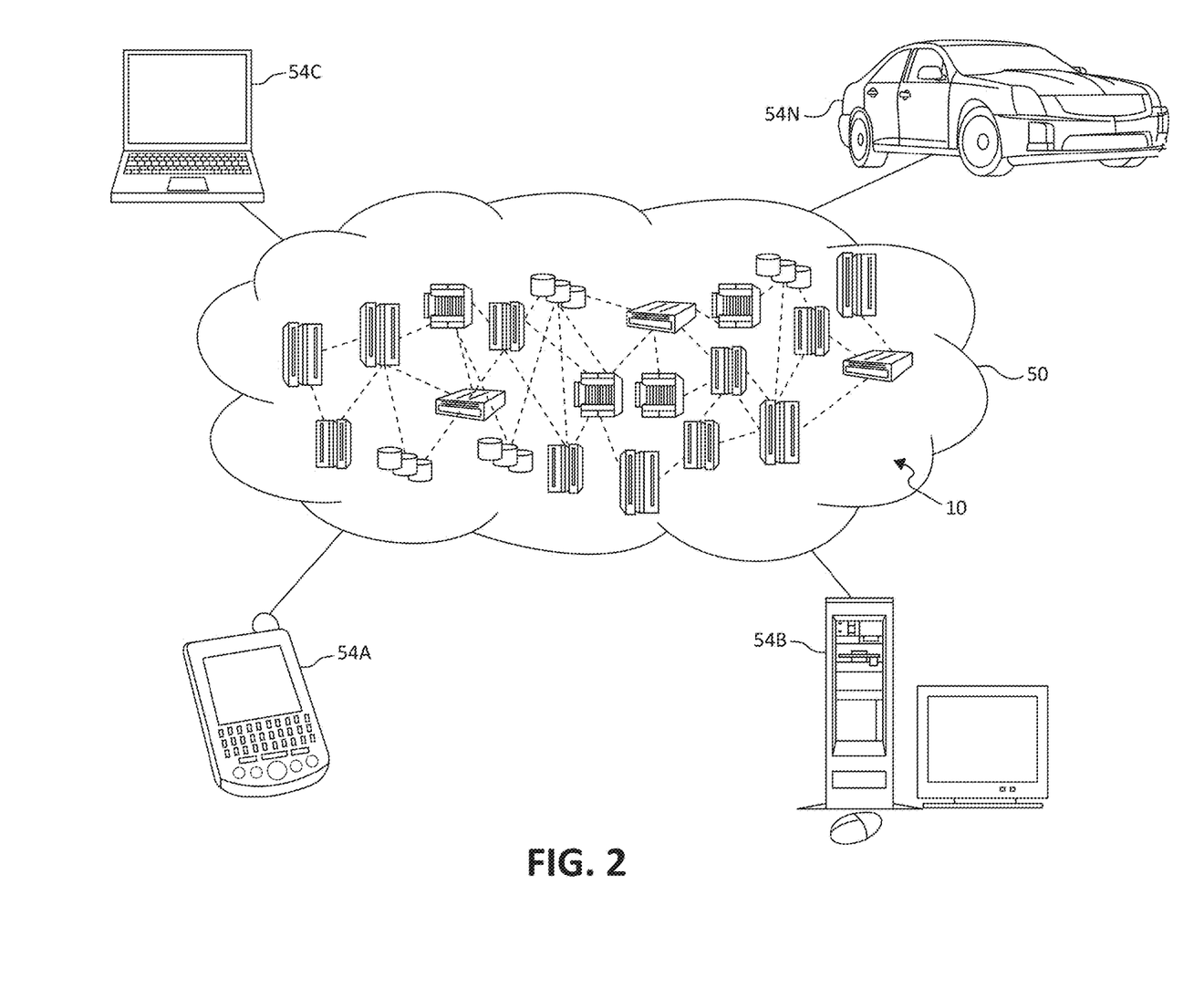
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
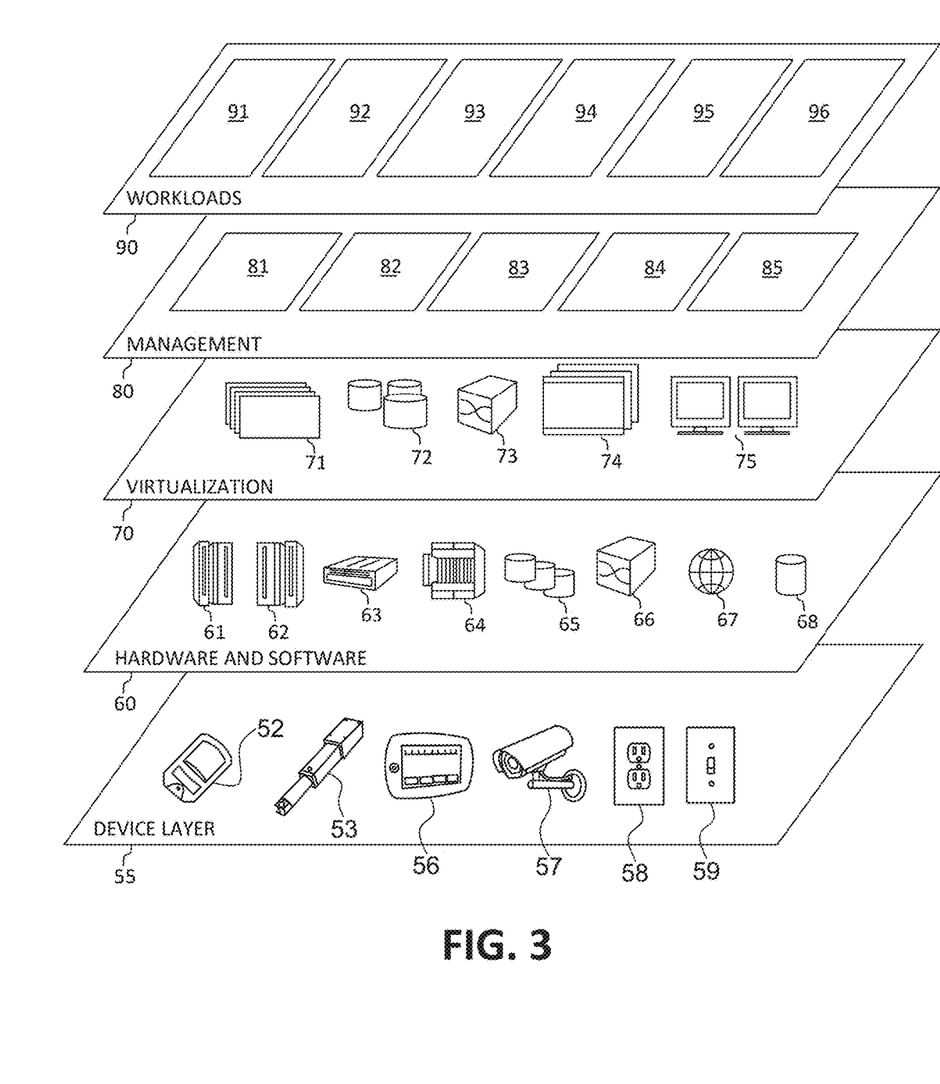
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various intelligent augmentation of word representations workloads and functions 96. In addition, intelligent augmentation of word representations workloads and functions 96 may include such operations as data analytics, data analysis, and as will be further described, notification functionality. One of ordinary skill in the art will appreciate that the intelligent augmentation of word representations workloads and functions 96 may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
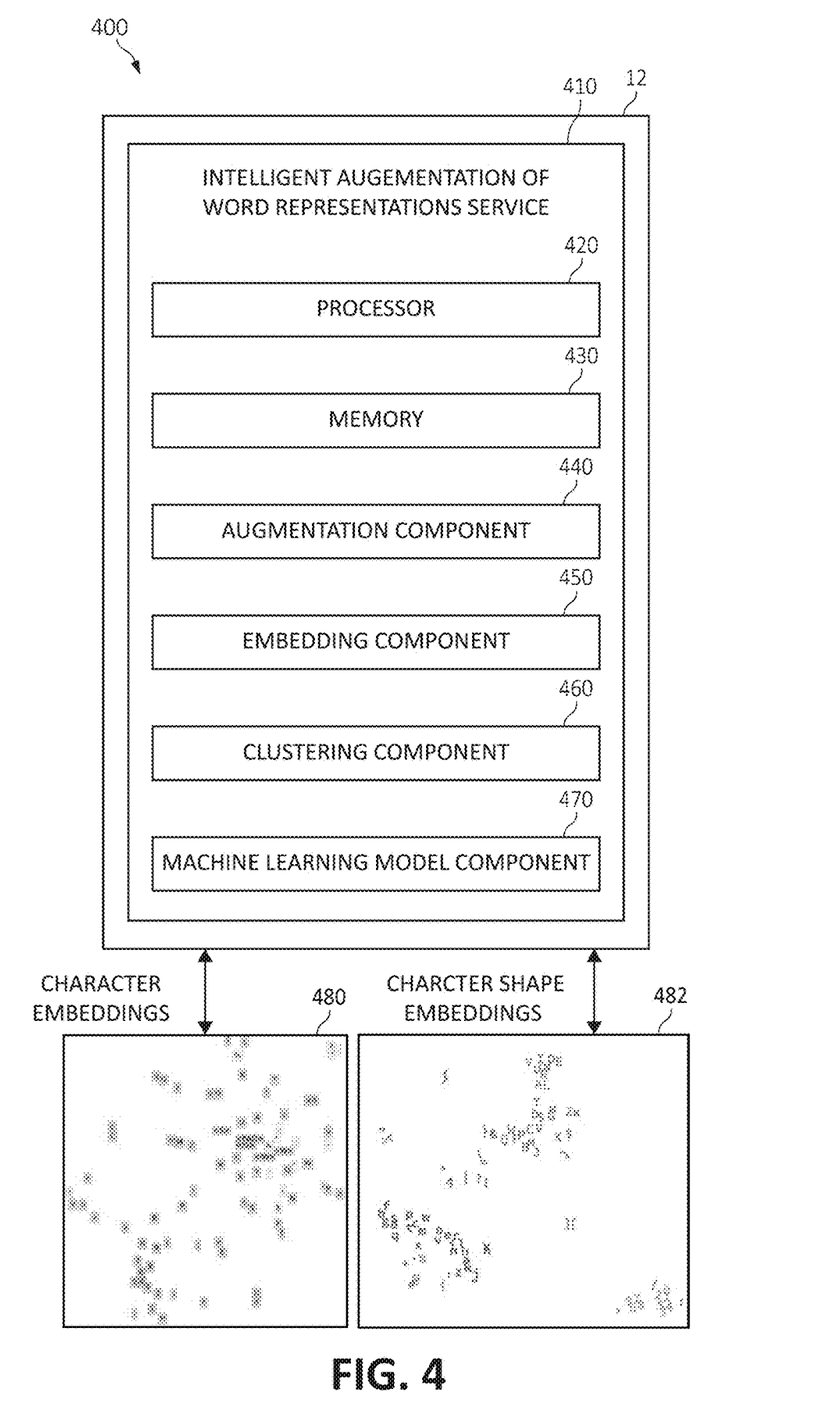
FIG. 4 is a diagram depicting various hardware and computing components functioning in accordance with aspects of the present invention.

Turning now to FIG. 4 a block diagram depicting exemplary functional components 400 according to various mechanisms of the illustrated embodiments is shown. FIG. 4 illustrates systems 400 for intelligent augmentation of word representations. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for intelligent causal knowledge extraction in accordance with the present invention. Many of the functional blocks 400 may execute as background processes on various components, either in distributed computing components, or on the user device, or elsewhere.

As illustrated in FIG. 4, intelligent augmentation of word representations service 410 is shown, incorporating processing unit 420 ("processors) and memory 430, which may also be the processing unit 16 ("processor") and memory 28 of FIG. 1, to perform various computational, data processing and other functionality in accordance with various aspects of the present invention. The processing unit 420 may be in communication with memory 430. The intelligent augmentation of word representations service 410 may be provided by the computer system/server 12 of FIG. 1.

As one of ordinary skill in the art will appreciate, the depiction of the various functional units in the intelligent augmentation of word representations service 410 is for purposes of illustration, as the functional units may be located within the intelligent augmentation of word representations service 410 or elsewhere within and/or between distributed computing components.

The intelligent augmentation of word representations service 410 may include an augmentation component 440, an embedding component 450, a clustering component 460, and a machine learning model component 470.

In one embodiment, by way of example only, the augmentation component 440, in association with the embedding component 450 and the machine learning model 470, may take as input, a set of text based documents (e.g., a corpus of text data (e.g., text documents) and a set of word embedding vectors.

As output, the augmentation component 440, in association with the embedding component 450 and the machine learning model 470, may create one or more character shape embeddings such as, for example, character shape embeddings 450 in an artificial neural network (ANN) by augmenting one or more word representations based on a set of NLP data, a set of word embedding vectors, and one or more clustering operations. The shape, category, and a contextual identify of the one or more word representations may be analyzed and used in creating the one or more character shape embeddings 482. That is, the character shape embeddings 482, which are vector based character representations capturing both characteristics and a vector space, are generated. That is, the character embeddings of block 440, compared to character shape embeddings 482, are only vectorized representations of characters that fail to capture the character shape similarities.

The augmentation component 440, in association with the embedding component 450 and the machine learning model 470, may merge a subset of word embedding vectors for each character present within each word embedding vector tokens of the one or more word representations to create the character shape embeddings. The augmentation component 440, in association with the embedding component 450 and the machine learning model 470, may generate a word embeddings character list using a vocabulary of characters contained in the one or more word representations.

The clustering component 460 may cluster the one or more character shape embeddings 450 and then adjust the character shape embeddings 450 based on the one or more character shape embeddings that are clustered.

The augmentation component 440, in association with the embedding component 450, the clustering component 460, and/or the machine learning model 470, may combine the clustered character shape embeddings with existing word representations to produce an artificial neural network layer within the ANN. The augmentation component 440, in association with the embedding component 450 and the machine learning model 470, may generate a word embeddings character list using a vocabulary of characters contained in the one or more word representations.

The machine learning model 470 may initiate a machine learning mechanism to learn a contextual usage and shape of each character of the one or more word representations in a selected language. By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMIDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure. The machine learning operations may include various AI instances. These AI instances may include IBM® Watson® Alchemy Language. (IBM Watson and Alchemy are trademarks of International Business Machines Corporation).

Figure 5:
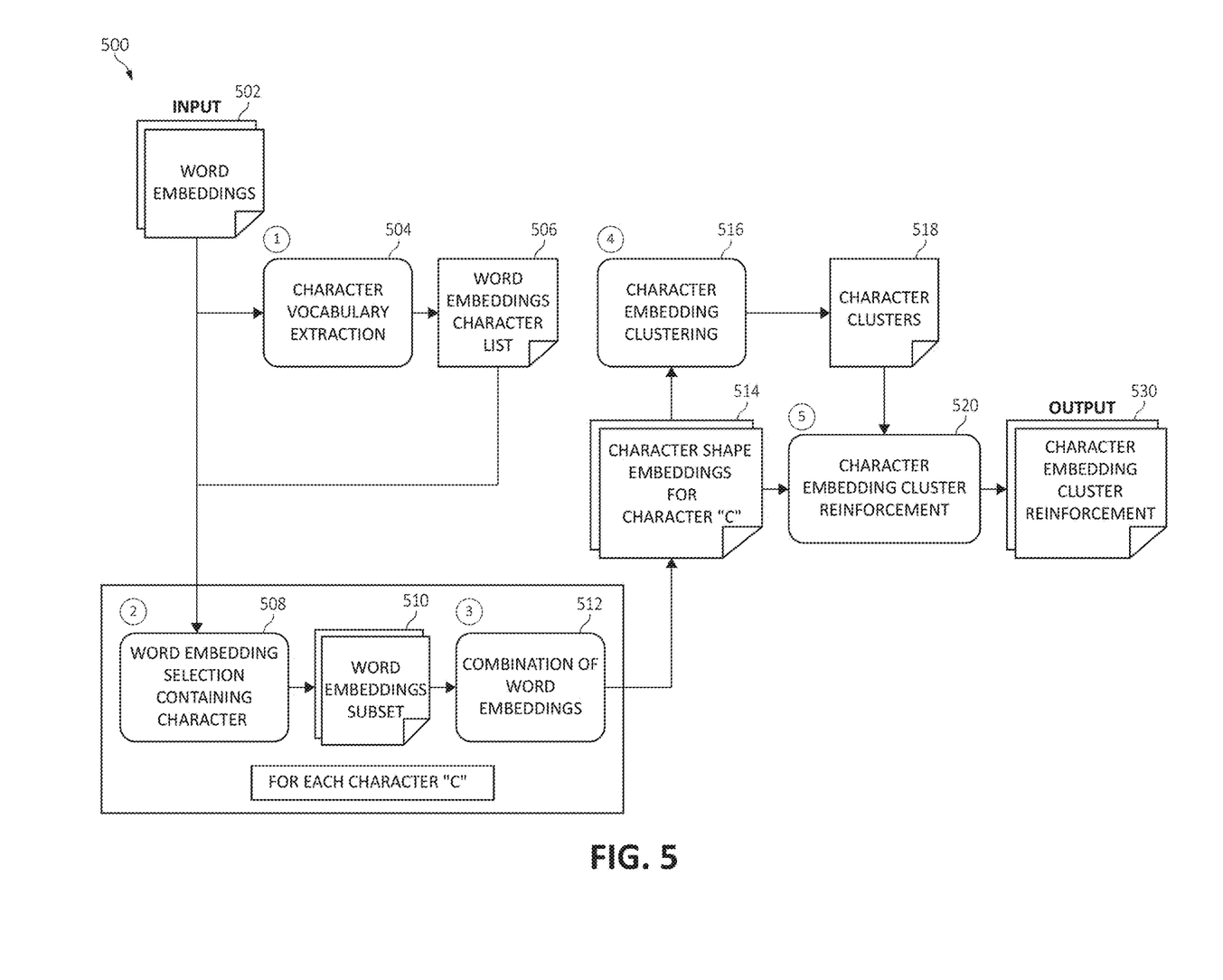
FIG. 5 is an additional block diagram depicting an operation for character shape embeddings creation in which various aspects of the present invention may be realized.

Turning now to FIG. 5, block diagram depicting exemplary functional components 500 according to various mechanisms of the illustrated embodiments for operation for character shape embeddings creation is shown. FIG. 5 illustrates system 500 for operation for character shape embeddings creation. Said differently, FIG. 5 depicts a causal extraction framework 500. As will be seen, many of the functional blocks may also be considered "modules" or "components" of functionality, in the same descriptive sense as has been previously described in FIGS. 1-4. With the foregoing in mind, the module/component blocks 500 may also be incorporated into various hardware and software components of a system in accordance with the present invention. Repetitive description of like elements, components, modules, services, applications, and/or functions employed in other embodiments described herein is omitted for sake of brevity.

Starting in step 1), one or more word embeddings 502 (e.g., a pre-existing set of word embedding vectors (e.g., Word2Vec, GloVe) may be provided as an input.

In step 2), a vocabulary characters may be extracted (e.g., a vocabulary set of all characters contained within tokens contained in the one or more word embeddings 502 that are input data) may be and may be complied to produce a word embeddings character list 502.

In step 3), for each character ("C" where "C" represents, by way of example only, a character) present/existing within the word embeddings character list 506, a) all word embedding vectors 508 (e.g., all word embedding selections containing characters) pertaining to a token which contains one or more of the characters ("C") may be extracted to produce a word embeddings subset 510, and b) word embedding vectors contained within the word embedding subset are combined (e.g., combination of word embeddings 512) together to produce character shape embeddings for the one or more of the characters ("C") (e.g., such a combination may include, for example, averaging out all word embedding subset vectors).

In step 4), the character shape embeddings vectors corresponding for all characters (e.g., character shape embeddings for character "C" 514) are then processed through a vector clustering algorithm (e.g., a K-Means operation) to produce a set of character shape embedding clusters 516 (to create the character clusters 518).

In step 5, each character shape embedding vector (e.g., each character cluster 518) may be amended to reinforce the character shape embedding vector's proximity to its nearest cluster centroid while preserving the differences between embedding vectors (i.e., such amendments may concatenate each character embedding with the centroid embedding), as in block 520. The result of this operation may be referred to as cluster reinforced character shape embeddings (e.g., character embedding cluster reinforcement 530) as the output, as in block 530).

Figure 6:
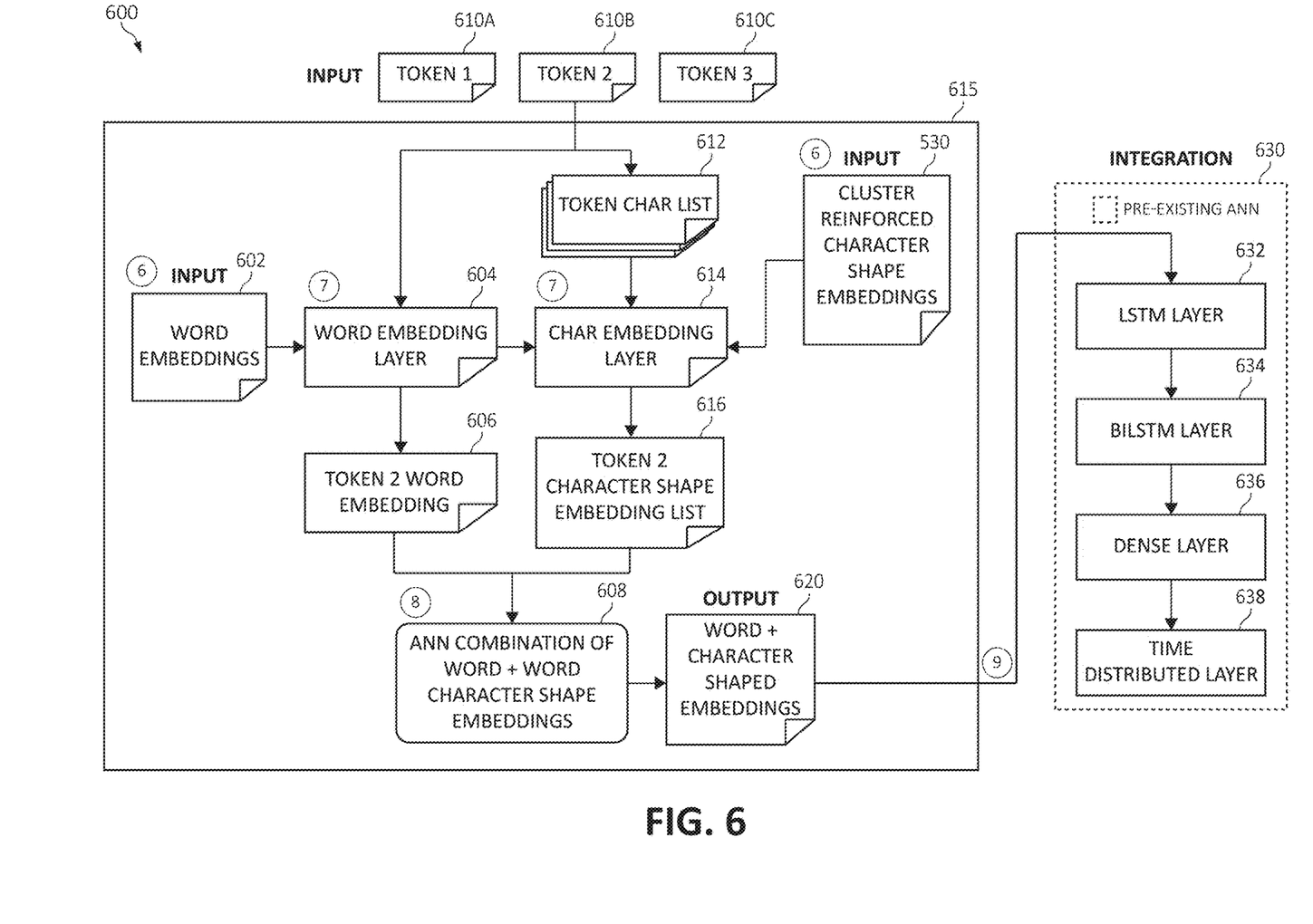
FIG. 6 is an additional block diagram depicting an operation for character shape embeddings neural network augmentation for named entity recognition detection in which various aspects of the present invention may be realized.

Using the input (e.g., the word embeddings 502 of FIG. 5) and/or output (e.g., character embedding cluster reinforcement 530 of FIG. 5), FIG. 6 depicts an operation for character shape embeddings neural network augmentation for named entity recognition detection. As will be seen, many of the functional blocks may also be considered "modules" or "components" of functionality, in the same descriptive sense as has been previously described in FIGS. 1-5. Repetitive description of like elements, components, modules, services, applications, and/or functions employed in other embodiments described herein is omitted for sake of brevity.

In one aspect, the operations for character shape embeddings neural network augmentation for named entity recognition detection may commence, by way of example only, following completion of step 5 of FIG. 5. As such, by way of example only, FIG. 6 may commence as step 6, which is a continuation of FIG. 5. Thus, as one of ordinary skill in the art will appreciate, the various steps depicted FIG. 6 may be completed in an order or version differing from the depicted embodiment to suit a particular scenario.

In step 6, a pre-existing set of word embeddings 602 (e.g., Word2Vec, GloVe) and the character embedding cluster reinforcement 530 of FIG. 5, may both be incorporated in distinct ANN embedding layers, such as, for example word embedding layer 604 for the word embeddings 602 and the character embedding layer 614 for the character embedding cluster reinforcement 530 of FIG. 5. Also, it should be noted that one or more tokens such as, for example, tokens 1-3 (e.g., token 610A, token 610B, and token 610C) may be used as input for the word embedding layer 604 and also used to create a token character "char" list 612, which man then be used for by the character embedding layer 614.

In step 7, for each token ("T") (e.g., from token 610A, token 610B, and token 610C), the corresponding 1) word embeddings along with 2) all the cluster reinforced character shape embedding vectors corresponding to each character contained in token ("T") (e.g., from token 610A, token 610B, and token 610C) may be extracted, as in blocks 606 (e.g., a token 2 word embeddings) and 616 (a token "token 2" character shape embedding list).

In step 8, both set of embeddings (e.g., the token 2 word embeddings 606 and token "token 2" character shape embedding list 616) may be combined for each token through various ANN layers (e.g., ANN combination of word and word character shape embeddings), as in block 608.

In step 9, as output as in block 720, a word and character shape encoded matrix may be then fed into any arbitrary ANN architecture as a regular word embedding input, as in block 630). That is, the word and character shape encoded matrix may be integrated into one or more pre-existing ANN such as, for example, ANN layer 632 (e.g., long short-term memory "LSTM" layer), ANN layer 634 (e.g., bidirectional recurrent neural network "BILSTM" layer), ANN layer 636 (e.g., dense layer"), and/or ANN layer 638 (e.g., a time distributed layer". Such a pre-existing ANN of block 620 may be used for instance for a named entity recognition ("NER") NLP operation.

Figure 7:
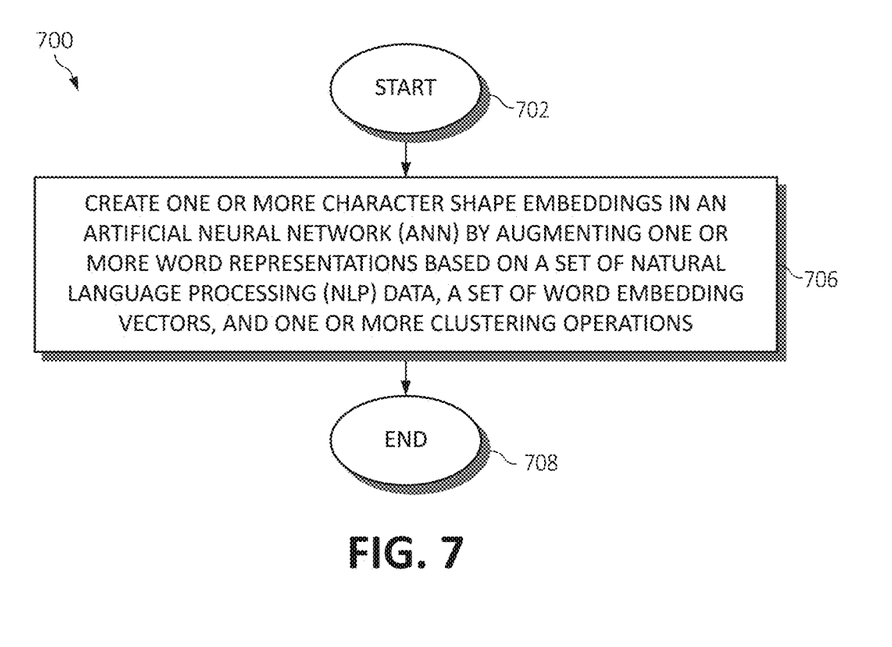
FIG. 7 is a flowchart diagram depicting an exemplary method providing intelligent augmentation of word representations in a computing environment by a processor in which aspects of the present invention may be realized.

Turning now to FIG. 7, an additional method 700 for providing intelligent augmentation of word representations in an artificial neural network by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. As one of ordinary skill in the art will appreciate, the various steps depicted in method 700 may be completed in an order or version differing from the depicted embodiment to suit a particular scenario. The functionality 700 may start in block 702.

One or more character shape embeddings may be created in an artificial neural network (ANN) by augmenting one or more word representations based on a set of natural language processing (NLP) data, a set of word embedding vectors, and one or more clustering operations, as in block 704. A shape, a category, and a contextual identify of the one or more word representations may be analyzed used in creating the one or more character shape embeddings. The functionality 700 may end in block 706.

Figure 8:
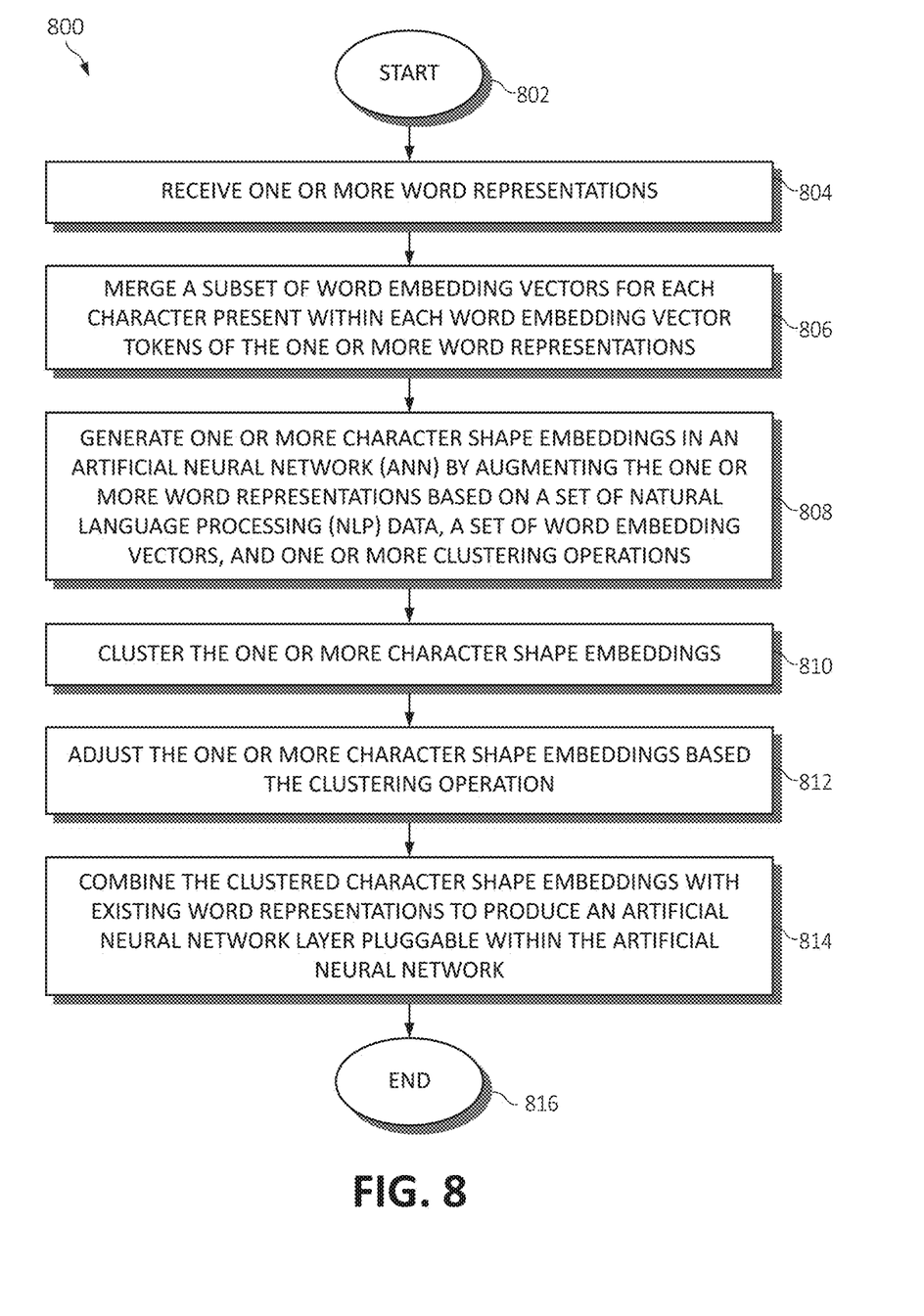
FIG. 8 is a flowchart diagram depicting an additional exemplary method for providing intelligent augmentation of word representations in a computing environment by a processor, again in which aspects of the present invention may be realized.

Turning now to FIG. 8, an additional method 800 for providing intelligent augmentation of word representations in an artificial neural network by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. As one of ordinary skill in the art will appreciate, the various steps depicted in method 800 may be completed in an order or version differing from the depicted embodiment to suit a particular scenario. The functionality 800 may start in block 802.

One or more word representations may be received, as in block 804. A subset of word embedding vectors may be merged for each character present within each word embedding vector tokens of the one or more word representations, as in block 806. One or more character shape embeddings may be generated in a neural network (e.g., an ANN) by augmenting the one or more word representations based on a set of natural language processing (NLP) data, a set of word embedding vectors, and one or more clustering operations, as in block 808. The one or more character shape embeddings may be clustered (e.g., via clustering operation), as in block 810. The one or more character shape embeddings may be adjusted based the clustering operation, as in block 812. The clustered character shape embeddings may be combined with existing word representations to produce an artificial neural network layer pluggable within the artificial neural network, as in block 814. The functionality 800 may end in block 816.

In one aspect, in conjunction with and/or as part of at least one block of FIGS. 7-8, the operations of methods 700 or 800 may include each of the following. The operations of methods 700 or 800 may merge a subset of word embedding vectors for each character present within each word embedding vector tokens of the one or more word representations to create the character shape embeddings, cluster the one or more character shape embeddings, adjust/alter the one or more character shape embeddings based on the one or more character shape embeddings that are clustered.

The operations of methods 700 or 800 may combine the clustered character shape embeddings with existing word representations to produce an artificial neural network layer within the ANN and initiate a machine learning mechanism to learn a contextual usage and shape of each character of the one or more word representations in a selected language. The operations of methods 700 or 800 may generate a word embeddings character list using a vocabulary of characters contained in the one or more word representations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent augmentation of word representations in a computing system by a processor, comprising:

creating one or more character shape embeddings in an artificial neural network (ANN) by augmenting one or more word representations based on a set of natural language processing (NLP) data, a set of word embedding vectors, and one or more clustering operations, wherein a shape, a category, and a contextual identify of the one or more word representations are analyzed and used in creating the one or more character shape embeddings.

2. The method of claim 1, further including merging a subset of word embedding vectors for each character present within each word embedding vector tokens of the one or more word representations to create the one or more character shape embeddings.

3. The method of claim 1, further including clustering the one or more character shape embeddings.

4. The method of claim 3, further including adjusting the one or more character shape embeddings based on the one or more character shape embeddings that are clustered.

5. The method of claim 3, further including combining the clustered character shape embeddings with existing word representations to produce an artificial neural network layer within the ANN.

6. The method of claim 1, further including initiating a machine learning mechanism to learn a contextual usage and shape of each character of the one or more word representations in a selected language.

7. The method of claim 1, further including generating a word embeddings character list using a vocabulary of characters contained in the one or more word representations.

8. A system for intelligent augmentation of word representations in a computing system, comprising:
one or more computers with executable instructions that when executed cause the system to:
create one or more character shape embeddings in an artificial neural network (ANN) by augmenting one or more word representations based on a set of natural language processing (NLP) data, a set of word embedding vectors, and one or more clustering operations, wherein a shape, a category, and a contextual identify of the one or more word representations are analyzed and used in creating the one or more character shape embeddings.

9. The system of claim 8, wherein the executable instructions when executed cause the system to merge a subset of word embedding vectors for each character present within each word embedding vector tokens of the one or more word representations to create the one or more character shape embeddings.

10. The system of claim 8, wherein the executable instructions when executed cause the system to cluster the one or more character shape embeddings.

11. The system of claim 10, wherein the executable instructions when executed cause the system to adjust the one or more character shape embeddings based on the one or more character shape embeddings that are clustered.

12. The system of claim 10, wherein the executable instructions when executed cause the system to combine the clustered character shape embeddings with existing word representations to produce an artificial neural network layer within the ANN.

13. The system of claim 8, wherein the executable instructions when executed cause the system to initiate a machine learning mechanism to learn a contextual usage and shape of each character of the one or more word representations in a selected language.

14. The system of claim 8, wherein the executable instructions when executed cause the system to generate a word embeddings character list using a vocabulary of characters contained in the one or more word representations.

15. A computer program product for intelligent augmentation of word representations by a processor, the computer program product comprising a non-transitory computer-readable storage medium having computer-readable program code portions stored therein, the computer-readable program code portions comprising:
an executable portion that creates one or more character shape embeddings in an artificial neural network (ANN) by augmenting one or more word representations based on a set of natural language processing (NLP) data, a set of word embedding vectors, and one or more clustering operations, wherein a shape, a category, and a contextual identify of the one or more word representations are considered and analyzed in creating the one or more character shape embeddings.

16. The computer program product of claim 15, further including an executable portion that merges a subset of word embedding vectors for each character present within each word embedding vector tokens of the one or more word representations to create the one or more character shape embeddings.

17. The computer program product of claim 15, further including an executable portion that:
clusters the one or more character shape embeddings; and
adjusts the one or more character shape embeddings based on the one or more character shape embeddings that are clustered.

18. The computer program product of claim 15, further including an executable portion that combines the clustered character shape embeddings with existing word representations to produce an artificial neural network layer within the ANN.

19. The computer program product of claim 15, further including an executable portion that initiates a machine learning mechanism to learn a contextual usage and shape of each character of the one or more word representations in a selected language.

20. The computer program product of claim 15, further including an executable portion that generates a word embeddings character list using a vocabulary of characters contained in the one or more word representations.

* * * * *